US012779975B2

(12) United States Patent
Medda et al.

(10) Patent No.: US 12,779,975 B2
(45) Date of Patent: Nov. 3, 2026

(54) CAR PROVIDED WITH AN INTERNAL COMBUSTION ENGINE

(71) Applicant: FERRARI S.P.A., Modena (IT)

(72) Inventors: Massimo Medda, Modena (IT); Alessandro Marchetti, Modena (IT); Michele Di Sacco, Modena (IT)

(73) Assignee: FERRARI S.P.A., Modena (IT)

( * ) Notice: Subject to any disclaimer, the term of this patent is extended or adjusted under 35 U.S.C. 154(b) by 427 days.

(21) Appl. No.: 18/514,007

(22) Filed: Nov. 20, 2023

(65) Prior Publication Data

US 2024/0174072 A1 May 30, 2024

(30) Foreign Application Priority Data

Nov. 25, 2022 (IT) ........................ 102022000024348

(51) Int. Cl.

| | |
|---|---|
| ***B60K 6/48*** | (2007.10) |
| ***B60K 6/405*** | (2007.10) |
| ***B60K 6/547*** | (2007.10) |
| *B60K 6/26* | (2007.10) |

(52) U.S. Cl.

CPC .............. *B60K 6/405* (2013.01); *B60K 6/547* (2013.01); *B60K 2006/268* (2013.01); *B60K 2006/4825* (2013.01)

(58) Field of Classification Search

CPC .. B60K 6/405; B60K 6/547; B60K 2006/268; B60K 2006/4825; F01B 7/14; F02B 75/282

See application file for complete search history.

(56) References Cited

U.S. PATENT DOCUMENTS

| | | | | |
|---|---|---|---|---|
| 7,234,423 B2 * | 6/2007 | Lindsay | .................. | F01L 1/348 123/188.5 |
| 7,611,432 B2 * | 11/2009 | Maguire | ............... | B60W 10/06 475/329 |
| 9,958,057 B2 * | 5/2018 | Sahasrabudhe | ......... | F16H 57/12 |

(Continued)

FOREIGN PATENT DOCUMENTS

| | | |
|---|---|---|
| DE | 725059 C | 9/1942 |
| DE | 10026458 A1 | 12/2001 |

(Continued)

OTHER PUBLICATIONS

Italian Search Report for Application No. 202200024348; Filing Date: Nov. 25, 2022; Date of Mailing: Apr. 6, 2023.

*Primary Examiner* — Katy M Ebner
(74) *Attorney, Agent, or Firm* — CANTOR COLBURN LLP

(57) ABSTRACT

A car having: two front wheels; two rear wheels; an opposed-piston internal combustion engine and having: a crankcase, a number of cylinders obtained in the crankcase, a number of pistons twice the number of the cylinders as two opposed pistons slide in each cylinder, and two crankshafts, which are longitudinally oriented and are each connected to a respective half of the pistons arranged on a same side of the crankcase; and a gearbox, which is connected to the crankshafts of the internal combustion engine and is arranged behind the internal combustion engine. The gearbox has two clutches, each separate and far from the other clutch and connected to a corresponding crankshaft, and two input shafts, each connected to a respective clutch.

17 Claims, 10 Drawing Sheets

(56) References Cited

U.S. PATENT DOCUMENTS

| | | | | |
|---|---|---|---|---|
| 10,260,598 | B2 * | 4/2019 | Kulkarni | F02B 75/282 |
| 10,626,793 | B2 * | 4/2020 | Radocaj | F02N 5/04 |
| 11,598,259 | B2 * | 3/2023 | Redon | B60K 1/02 |
| 11,982,225 | B2 * | 5/2024 | Redon | B60K 1/02 |
| 2011/0146629 | A1 * | 6/2011 | Radocaj | F02N 5/04<br>123/179.25 |
| 2014/0299109 | A1 * | 10/2014 | Fuqua | F01B 7/14<br>123/51 R |
| 2017/0314646 | A1 * | 11/2017 | Kulkarni | F16H 3/66 |
| 2020/0080626 | A1 * | 3/2020 | Kashyap | F16F 15/173 |
| 2021/0061255 | A1 | 3/2021 | Redon et al. | |

FOREIGN PATENT DOCUMENTS

| | | | | |
|---|---|---|---|---|
| DE | 102007062149 | A1 | 6/2009 | |
| DE | 102010009874 | A1 | 8/2011 | |
| DE | 102011114854 | B4 * | 9/2014 | F01B 23/10 |
| EP | 2228249 | A1 | 9/2010 | |
| GB | 428609 | A | 5/1935 | |
| WO | WO-2021086622 | A1 * | 5/2021 | B60W 20/15 |

* cited by examiner

CAR PROVIDED WITH AN INTERNAL COMBUSTION ENGINE

CROSS-REFERENCE TO RELATED APPLICATIONS

This patent application claims priority from Italian patent application no. 102022000024348 filed on Nov. 25, 2022, the entire disclosure of which is incorporated herein by reference.

TECHNICAL FIELD

The present invention relates to a car provided with an internal combustion engine.

The present invention is advantageously applied to a car provided with an internal combustion engine powered with hydrogen, to which the following discussion will explicitly refer without thereby losing generality.

PRIOR ART

Hydrogen does not exist in the natural state on the earth because it is combined in molecules with other atoms (for example, water or hydrocarbons) and therefore, in order to have hydrogen, it is necessary to produce it by means of reforming or electrolysis other consuming energy (consequently, hydrogen is not an energy source but an energy vector).

The environmental impact of a car provided with an internal combustion engine powered with hydrogen is much lower than the environmental impact of a similar car provided with an internal combustion engine powered with a fossil fuel, as an internal combustion engine powered with hydrogen does not generate greenhouse gas ($CO_2$) and generates very little CO, HC and fine particulate matter (generated due to a minimum quantity of lubricating oil which is burned in the combustion chambers).

Hydrogen has a reduced density (having a very simple molecule composed of only two hydrogen atoms) and therefore, in order to be able to store a suitable quantity (mass) of hydrogen, it is necessary to utilize very voluminous hydrogen tanks also when the maximum storage pressure of hydrogen reaches 700 bars (which currently represent a market standard). Besides, the hydrogen tanks are to be arranged in a position which is suitably protected against impacts from all directions and the hydrogen tanks have to preferably have a spherical shape or a cylindrical shape so as to be able to be resistant to the high internal pressure of hydrogen; these constraints further complicate the positioning of the hydrogen tanks in a car.

Consequently, a car provided with an internal combustion engine powered with hydrogen is longer and heavier (autonomy being equal) than a similar car provided with an internal combustion engine powered with gasoline and thus results definitely penalized in the dynamic performance.

Documents DE10026458A1, DE725059C, GB428609A and US2021061255A1 describe an opposed-piston internal combustion engine.

DESCRIPTION OF THE INVENTION

The object of the present invention is to provide a car provided with an internal combustion engine powered with hydrogen which allows achieving a high performance (particularly in sports driving on track) without penalizing the autonomy.

According to the present invention, a car provided with an internal combustion engine powered with hydrogen is provided, in accordance with what is claimed by the appended claims.

The claims describe preferred embodiments of the present invention forming integral part of the present description.

BRIEF DESCRIPTION OF THE DRAWINGS

The present invention will now be described with reference to the accompanying drawings, which illustrate some non-limiting example embodiments thereof, wherein.

PREFERRED EMBODIMENTS OF THE INVENTION

Figure 1:
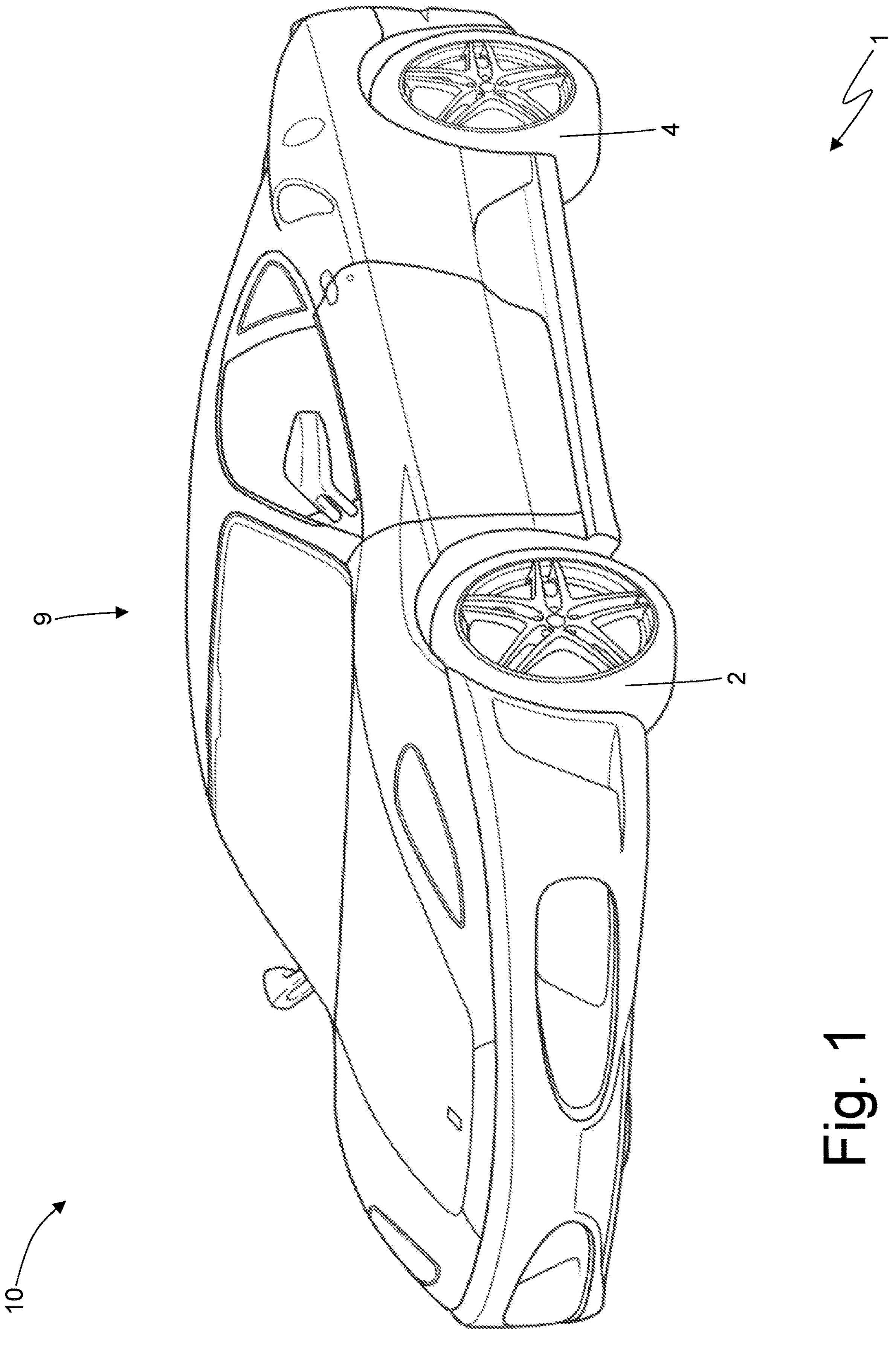
FIG. 1 is a perspective view of a car provided with an internal combustion engine.
Figure 4:
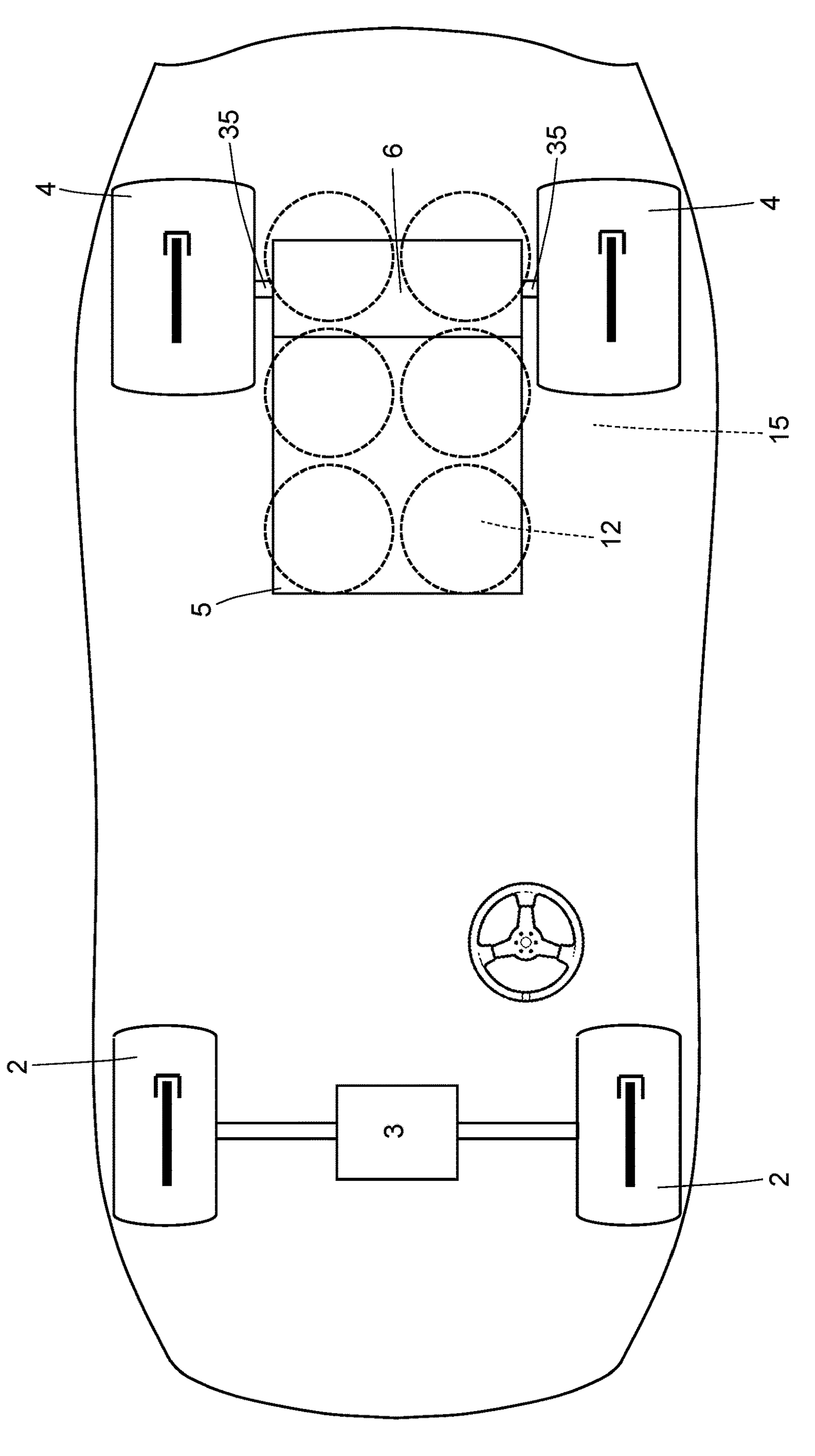
FIG. 4 is a schematic plan view of the car of FIG. 1.

In FIG. 1, reference numeral 1 indicates, as a whole, a hybrid car (i.e. having hybrid propulsion) provided with two front drive wheels 2 which receive the torque from an (at least one) electric machine 3 (schematically illustrated in FIG. 4) and with two rear drive wheels 4 which receive the torque from an internal combustion engine 5 (schematically illustrated in FIG. 4).

Figure 8:
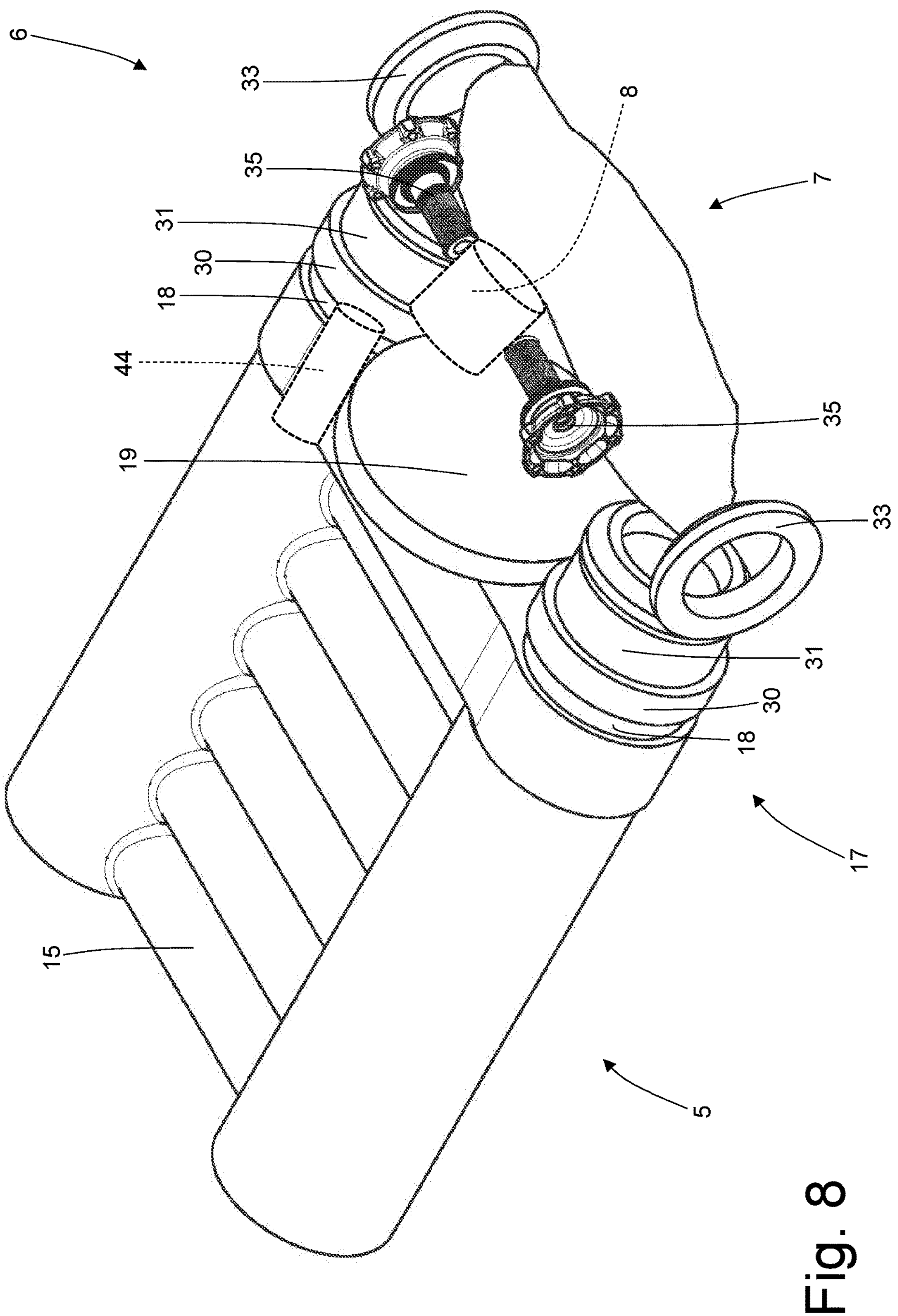
FIG. 8 is a perspective view of the internal combustion engine of FIG. 1 combined with a drive system.

According to what is illustrated in FIG. 4, the electric machine 3 is connected to the two front drive wheels 2 by means of a drive system (of known type and not illustrated) provided with a front differential; similarly, also the internal combustion engine 5 is connected to the two rear drive wheels 4 by means of a drive system 6 provided with a 7 and with a rear differential 8 gearbox (schematically illustrated in FIG. 8).

Preferably, the electric machine 3 is reversible (i.e. it can operate both as electric motor absorbing electric energy and generating a mechanical torque, and as electric generator absorbing mechanical energy and generating electric energy); according to other embodiments not illustrated, the electric machine 3 is not provided (and therefore the car 1 is not hybrid).

Figure 2:
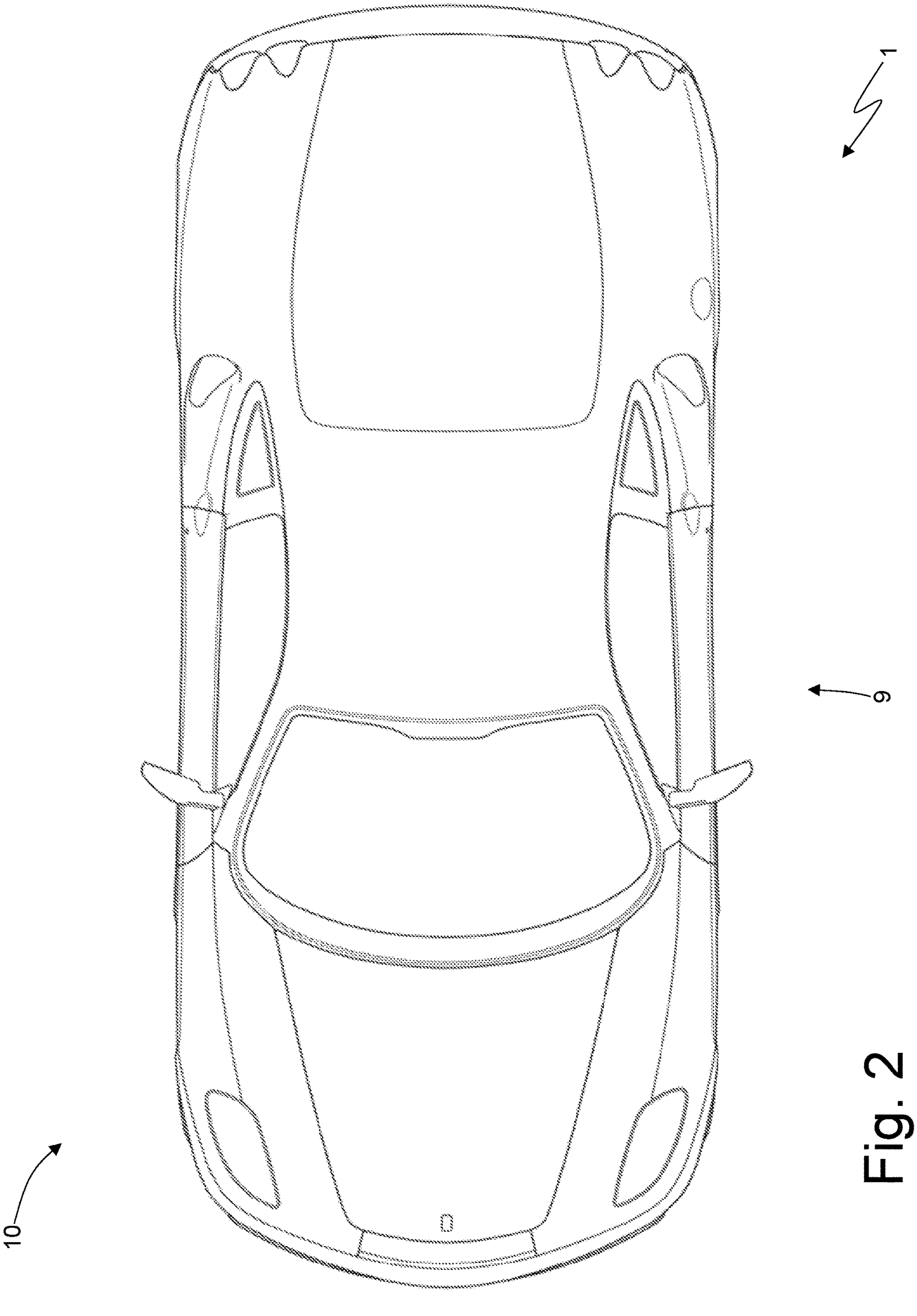
FIGS. 2 and 3 are a top view and a bottom view respectively of the car of FIG. 1.

According to what is illustrated in FIGS. 1 and 2, the car 1 comprises a passenger compartment 9 which is arranged between the two front wheels 2 and the two rear wheels 4 and contains on its inside a driving position (schematically illustrated in FIG. 4) which is arranged on the left side (alternatively, it could also be arranged on the right side).

According to what is illustrated in FIGS. 1 and 2, the car 1 comprises a body 10 which delimits (among the other things) the passenger compartment 9 and has two sides in which at least two doors are obtained.

Figure 3:
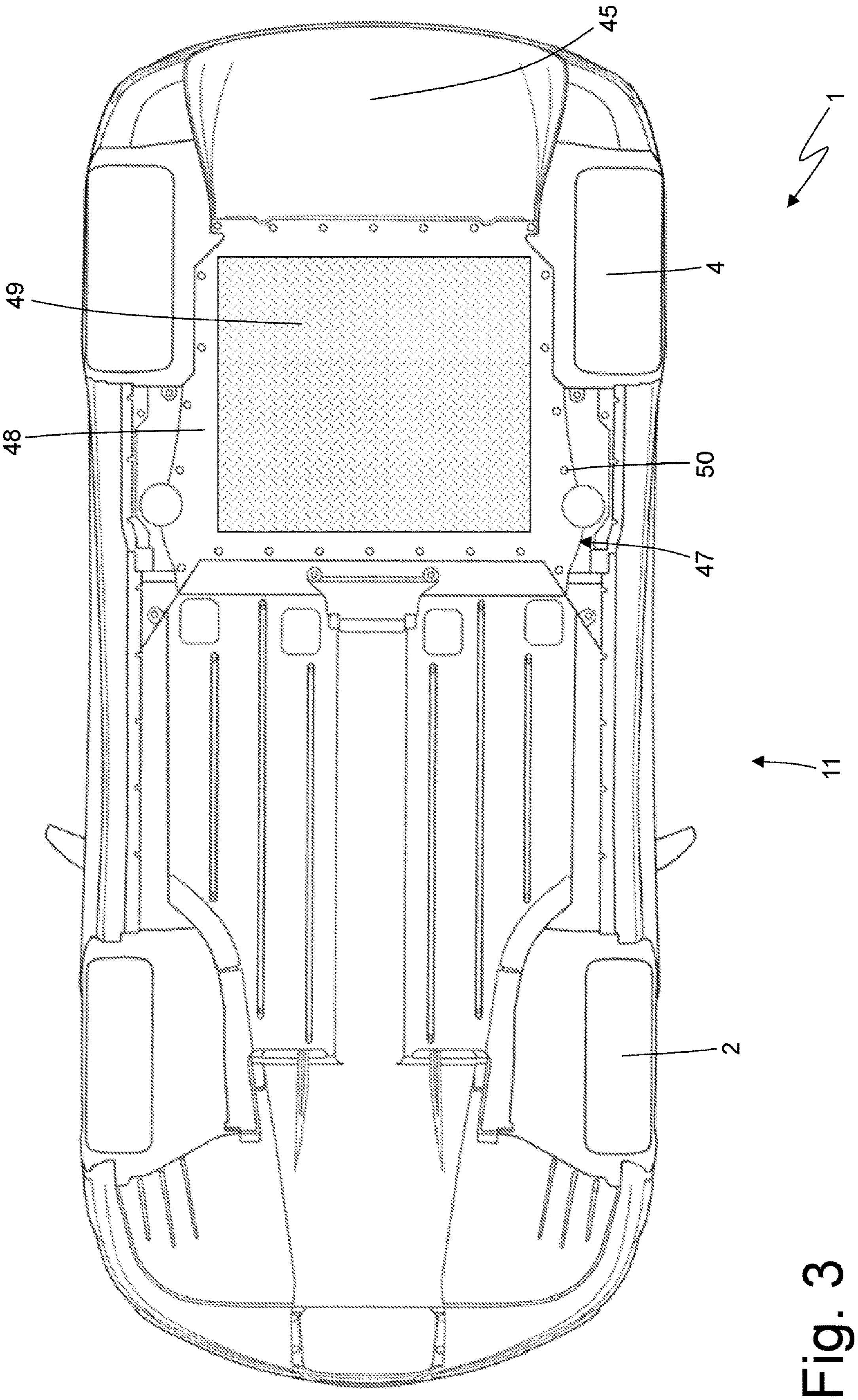

According to what is illustrated in FIG. 3, the car 1 comprises a bottom 11 which constitutes the lowest part of the car 1 and in use faces a road surface on which the car 1 is moving.

According to a preferred embodiment, the internal combustion engine 5 is powered with hydrogen (or also another gaseous fuel). According to a different embodiment, the internal combustion engine 5 is powered with gasoline (or also another liquid fuel).

Figure 5:
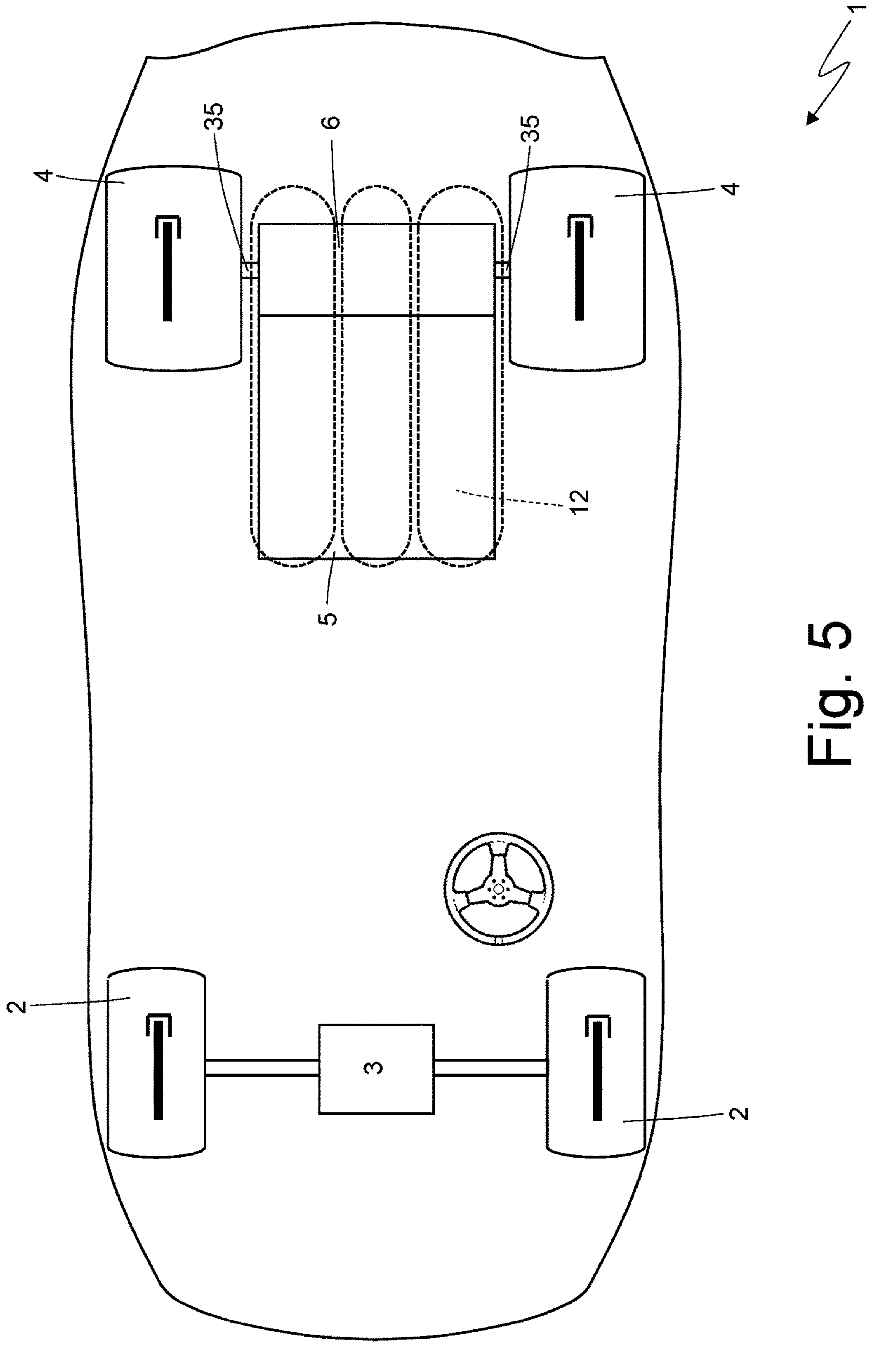
FIG. 5 is a schematic plan view of a variation of the car of FIG. 1.

According to what is illustrated in FIG. 4, the internal combustion engine 5 is powered with hydrogen which is stored at high pressure (for example, having a maximum pressure of approximately 700 bars) in six different tanks 12 which have a spherical shape and have the same dimension (but could also have different dimensions). In the alternative embodiment illustrated in FIG. 5, three tanks 12 having a cylindrical shape and different dimensions (i.e. the central tank 12 is smaller than the two side tanks 12) are present. According to other embodiments not illustrated, a different number of tanks 12 is provided which can all have the same shape (spherical, cylindrical or of other type) or also different shapes (for example, some tanks 12 could have a spherical shape, whereas other tanks could have a cylindrical shape). More in general, the single tank 12 or the several tanks 12 can have any shape which can also be different from the spherical shape or from the cylindrical shape.

The internal combustion engine 5 is arranged in a central or rear position, i.e. the internal combustion engine is arranged behind the passenger compartment 9 and is located between the front wheels 2 and the rear wheels 4 (central arrangement as is illustrated in the accompanying figures) or is located beyond the rear wheels 4 (rear arrangement not illustrated). Furthermore, as is better illustrated in FIG. 6, the internal combustion engine 5 has a "sole" shape, i.e. a shape that is longitudinally and transversely wide and vertically very contained. The drive system 6 is arranged immediately behind the internal combustion engine 5 (i.e. is arranged at the back with respect to the internal combustion engine 5 and is located at the same vertical level of the internal combustion engine 5).

Figure 6:
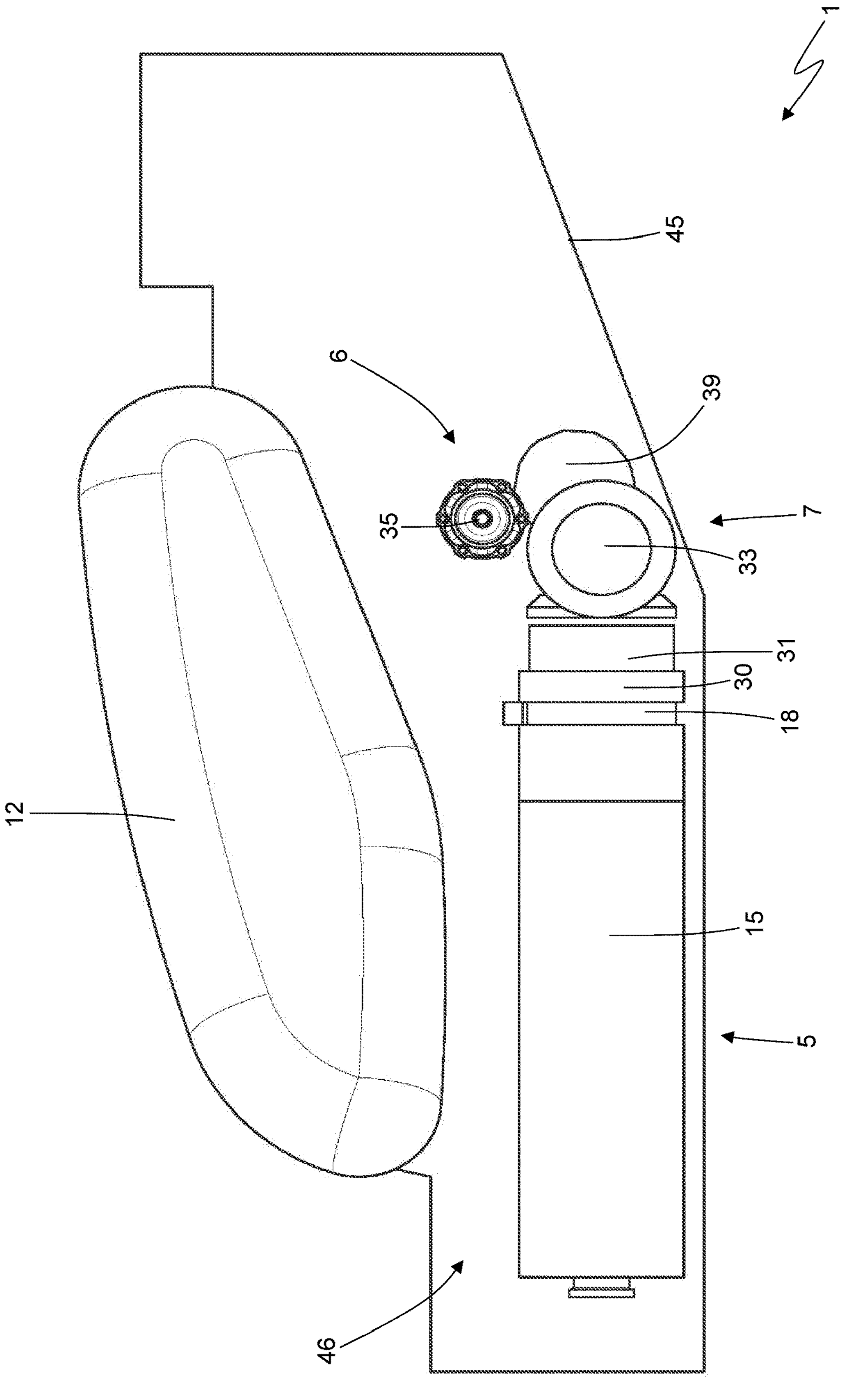
FIG. 6 is a schematic side view of a rear part of the car of FIG. 1.

As is better illustrated in FIG. 6, the tanks 12 are arranged above the internal combustion engine 5 and above the drive system 6; i.e. each tank 12 is arranged above the internal combustion engine 5 and/or above the drive system 6. In other words, the tanks 12 are arranged (approximately) at the same vertical level and are located above the internal combustion engine 5 and above the drive system 6.

Figure 7:
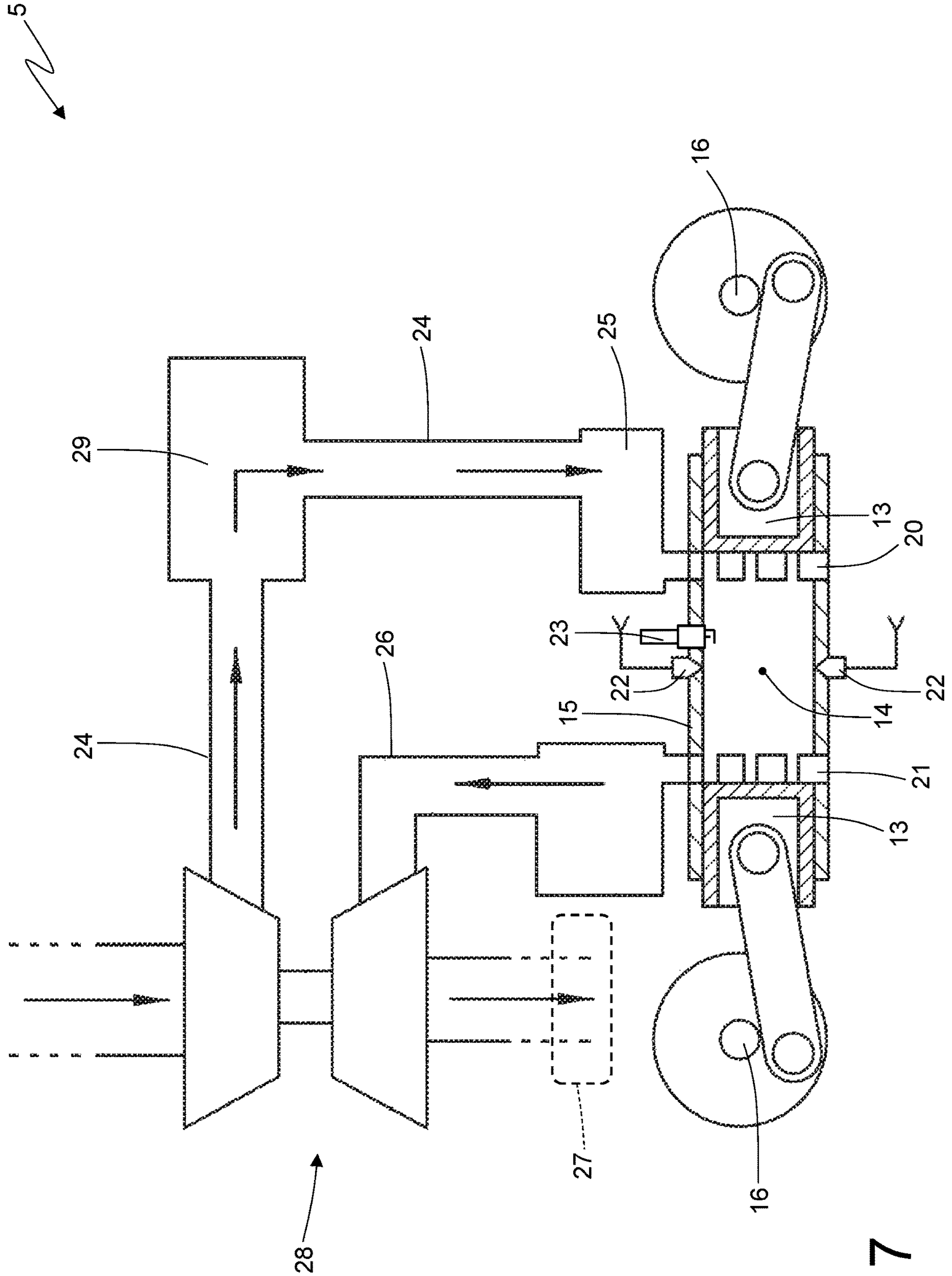
FIG. 7 is a schematic view of an internal combustion engine of the car of FIG. 1.
Figure 9:
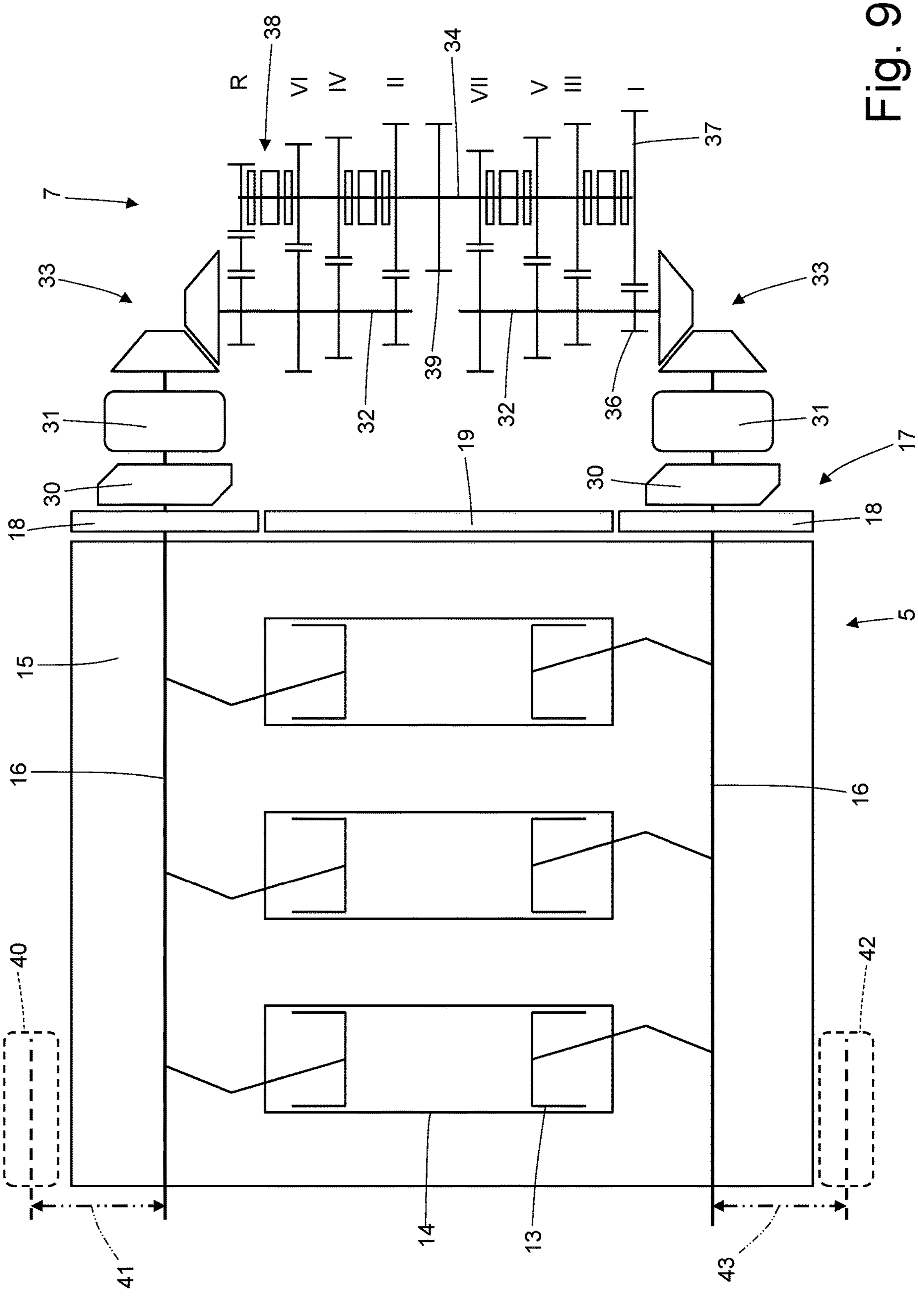
FIG. 9 is a schematic view of the internal combustion engine and of the drive system of FIG. 8.

According to what is illustrated in FIGS. 7, 8 and 9, the internal combustion engine 5 is an opposed-piston two-stroke internal combustion engine and the number of pistons 13 is twice the number of the cylinders 14 obtained in the crankcase 15 as two opposed pistons 13 slide in each cylinder 14 (in particular, three or six cylinders 14 and six or twelve pistons 13 are provided). The internal combustion engine 5 comprises two crankshafts 16 which are positioned at the two ends of the crankcase 15; each crankshaft 16 is connected by means of respective connecting rods to three pistons 13 arranged on the same side of the crankshaft 16.

The two crankshafts 16 are connected to one another by means of a gear transmission 17 (better illustrated in FIG. 9) so that the two crankshafts 16 always rotate in a synchronized manner; in the (non-limiting) example illustrated in FIG. 9, the gear transmission 17 comprises two lateral toothed wheels 18, each integral with a corresponding crankshaft 16, and one single central toothed wheel 19 which is hinged idle to the crankcase 15 and meshes with both lateral toothed wheels 18 (according to other embodiments, two, three or four central toothed wheels 19 could be provided). The connection of the two crankshafts 16 made by the gear transmission 17 causes the motion of the pistons 13 of a crankshaft 16 to always correspond to an identical motion of the pistons 13 of the other crankshaft 16, but in opposite direction. Two coupled pistons 13 (i.e. arranged in the same cylinder 14) move away from one another in the expansion phase and move close to one another in the compression phase; i.e. it is as if the stroke is divided between the two pistons 13 and this enables adopting the high stroke/bore ratios necessary for a two-stroke engine without reaching too high average velocity values of the piston 13.

In the internal combustion engine 5 a head is not present, since a piston 13 acts as head for the other piston 13. Therefore, the engine block of the internal combustion engine 5 is only composed of the crankcase 15.

In the internal combustion engine 5 neither suction valves nor the exhaust valves are present, the function of which is carried out by suction ports 20 and exhaust ports 21 (illustrated in FIG. 7) which are opened and closed (as it occurs in the two-stroke engines) by the alternative movement of the pistons 13.

According to what is illustrated in FIG. 7, in each cylinder 14 two diametrically opposed fuel injectors 22 are provided which are arranged in the centre of the cylinder 14 and perform a direct injection of the fuel into the cylinder 14; according to other embodiments not illustrated, the number and/or the arrangement of the fuel injectors 22 are different. FIG. 7 illustrates a direct fuel injection into the cylinders 14 but the fuel injection into the cylinders 14 could also be (partially or completely) indirect.

In each cylinder 14 two diametrically opposed spark plugs 23 are provided which are arranged in the centre of the cylinder 14 and are cyclically activated for triggering the ignition of the mixture of air (comburent) and fuel present in the combustion chamber at the end of the compression phase; according to other embodiments not illustrated, the number and/or the arrangement of the spark plugs 23 are different.

According to what is illustrated in FIG. 7, the internal combustion engine 5 comprises a suction system which draws air from the external environment for conveying the air into the cylinders 14 (the inlet of the air in the cylinders 14 occurs through the suction ports 20). The suction system comprises a suction duct 24 which ends in a suction manifold 25 which is directly connected to all the cylinders 14; the inlet of air in the suction manifold 25 is adjusted by a throttle valve.

According to what is illustrated in FIG. 7, the internal combustion engine 5 comprises an exhaust system which releases the exhaust gases coming from the cylinders 14 into the external environment. The exhaust system comprises an exhaust duct 26 which originates from the exhaust ports 21 and is provided with an (at least one) exhaust gas treatment device 27 (typically a catalyst).

According to what is illustrated in FIG. 7, a turbocharger 28 is provided which increases the volumetric efficiency (filling) of the cylinders 14 and consequently an intercooler 29 is arranged along the suction duct 24.

According to what is illustrated in FIG. 9, each crankshaft 16 is longitudinally oriented (i.e. parallel to the motion direction), projects out of the crankcase 15 at the back (i.e. through the rear wall), and is connected to the corresponding lateral toothed wheel 18 of the gear transmission 17; downstream of the lateral toothed wheel 18, each crankshaft 16 is connected to a flywheel 30 (preferably a dual-mass flywheel).

According to what is illustrated in FIG. 9, the gearbox 7 is arranged immediately behind the internal combustion engine 5 and is a dual-clutch gearbox. Therefore, the gearbox 7 comprises two clutches 31, each directly connected to a corresponding crankshaft 16 downstream of the respective flywheel 30; i.e. each crankshaft 16 ends at the inlet of a corresponding clutch 31 which is located after the respective flywheel 30. Consequently, the two clutches 31 are separate and far from one another. The gearbox 7 comprises two input shafts 32 which are coaxial to one another and face one another head-to-head (i.e. are not inserted inside one another) and are transversely oriented (i.e. perpendicular to the motion direction). Each input shaft 32 is connected to a respective clutch 31 through a bevel gear 33 which transforms the rotation around a longitudinal axis of rotation (coming from a crankshaft 16 arranged longitudinally through a clutch 31) into a rotation around a transverse axis of rotation (to be transmitted to an input shaft 32 arranged transversely).

The gearbox 7 comprises one single output shaft 34 connected to the differential 8 which transmits the motion to the rear drive wheels 4; according to an alternative and equivalent embodiment, the dual-clutch gearbox 7 comprises two output shafts 34 both connected to the differential 8. From the differential 8 a pair of axle shafts 35 depart (schematically illustrated in FIGS. 4 and 5), each integral with a rear drive wheel 4.

The gearbox 7 has seven forward gear ratios indicated by Roman numerals (first gear ratio I, second gear ratio II, third gear ratio III, fourth gear ratio IV, fifth gear ratio V, sixth gear ratio VI and seventh gear ratio VII) and a reverse gear (indicated by the letter R). Each input shaft 32 and the output shaft 34 are mechanically coupled to one another by means of a plurality of gears, each defines a respective gear ratio and comprises a primary toothed wheel 36 mounted on the input shaft 32 and a secondary toothed wheel 37 mounted on the output shaft 34. In order to allow the correct operation of the gearbox 7, all the odd gear ratios (first gear ratio I, third gear ratio III, fifth gear ratio V, seventh gear ratio VII) are coupled to a same input shaft 32, whereas all the even gear ratios (second gear ratio II, fourth gear ratio IV, and sixth gear ratio VI) are coupled to the other input shaft 32.

Each primary toothed wheel 36 is splined to a respective input shaft 32 for rotating always integral with the input shaft 32 and permanently meshes with the respective secondary toothed wheel 37; whereas, each secondary toothed wheel 37 is mounted idle on the output shaft 34. Furthermore, the gearbox 7 comprises four double synchronizers 38, each mounted coaxial to the output shaft 34, arranged between two secondary toothed wheels 37, and adapted to be actuated for alternatively engaging the two respective secondary toothed wheels 37 to the output shaft 34 (i.e. for alternatively making the two respective secondary toothed wheels 37 angularly integral with the output shaft 34). In other words, each synchronizer 38 can be shifted in a direction for engaging a secondary toothed wheel 37 with the output shaft 34, or can be shifted in the other direction for engaging the other secondary toothed wheel 37 with the output shaft 34.

According to a different embodiment not illustrated, the primary toothed wheels 36 are mounted idle on the respective input shafts 32, the synchronizers 38 are coupled to the primary toothed wheels 36, and the secondary toothed wheels 37 are splined to the output shaft 34 for always rotating integral with the output shaft 34.

The differential 8 receives the motion from the output shaft 34 of the gearbox 7 through an output toothed wheel 39 integral with the output shaft 34, is devoid of bevel gear (being the output shaft 34 already arranged transversely) and transmits the motion to the two rear drive wheels 4 by means of the two respective axle shafts 35. Preferably and according to what is illustrated in FIG. 8, the differential 8 is arranged above the gearbox 7, i.e. above the shafts 32 and 34 of the gearbox 7.

In the embodiment illustrated in the accompanying figures, each clutch 31 is coaxial to the corresponding (longitudinally oriented) crankshaft 16 and is directly connected to an end of the corresponding crankshaft 16; consequently, between each clutch 31 and the corresponding (transversely oriented) input shaft 32 there is interposed a bevel gear 33. According to a different embodiment not illustrated, each clutch 31 is coaxial to the corresponding (transversely oriented) input shaft 32 and is directly connected to an end of the corresponding input shaft 32; consequently, between each clutch 31 and the corresponding (longitudinally oriented) crankshaft 16 there is interposed a bevel gear 33.

According to what is illustrated in FIGS. 8 and 9, each crankshaft 16 projects out of the crankcase 15 also on the opposite side relative to the gearbox 7, i.e. projects out of the crankcase 15 at the front (i.e. through a front wall opposite the rear wall). The front end of a crankshaft 16 (which projects out of the crankcase 15) is connected to an alternator 40 (i.e. to an electric energy generator) by means of a drive 41 (preferably a belt drive); in this embodiment, the alternator 40 is arranged beside the crankcase 15. According to a different embodiment not illustrated, the alternator 40 is coaxial to the respective crankshaft 16 and is directly head-to-head connected to the crankshaft 16 without the need for the drive 41; in this embodiment, the alternator 40 is arranged in front of the crankcase 15. The front end of the other crankshaft 16 (which projects out of the crankcase 15) is connected to a compressor 42 (which is part of an air conditioning system) by means of a drive 43 (preferably a belt drive); in this embodiment, the compressor 42 is arranged beside the crankcase 15. According different embodiment not illustrated, the compressor 42 is coaxial to the respective crankshaft 16 and is directly head-to-head connected to the crankshaft 16 without the need for the drive 43; in this embodiment, the compressor 42 is arranged in front of the crankcase 15.

According to what is illustrated in FIG. 8, a starter motor 44 is provided which is utilized for starting the internal combustion engine 5 and is connected to the gear transmission 17; i.e. a shaft of the starter motor 44 is provided with a toothed wheel which meshes with one of the toothed wheels 18 and 19 of the gear transmission 17. In particular, in the embodiment illustrated in the accompanying figures, the starter motor 44 is connected to the central toothed wheel 19 of the gear transmission 17.

Figure 10:
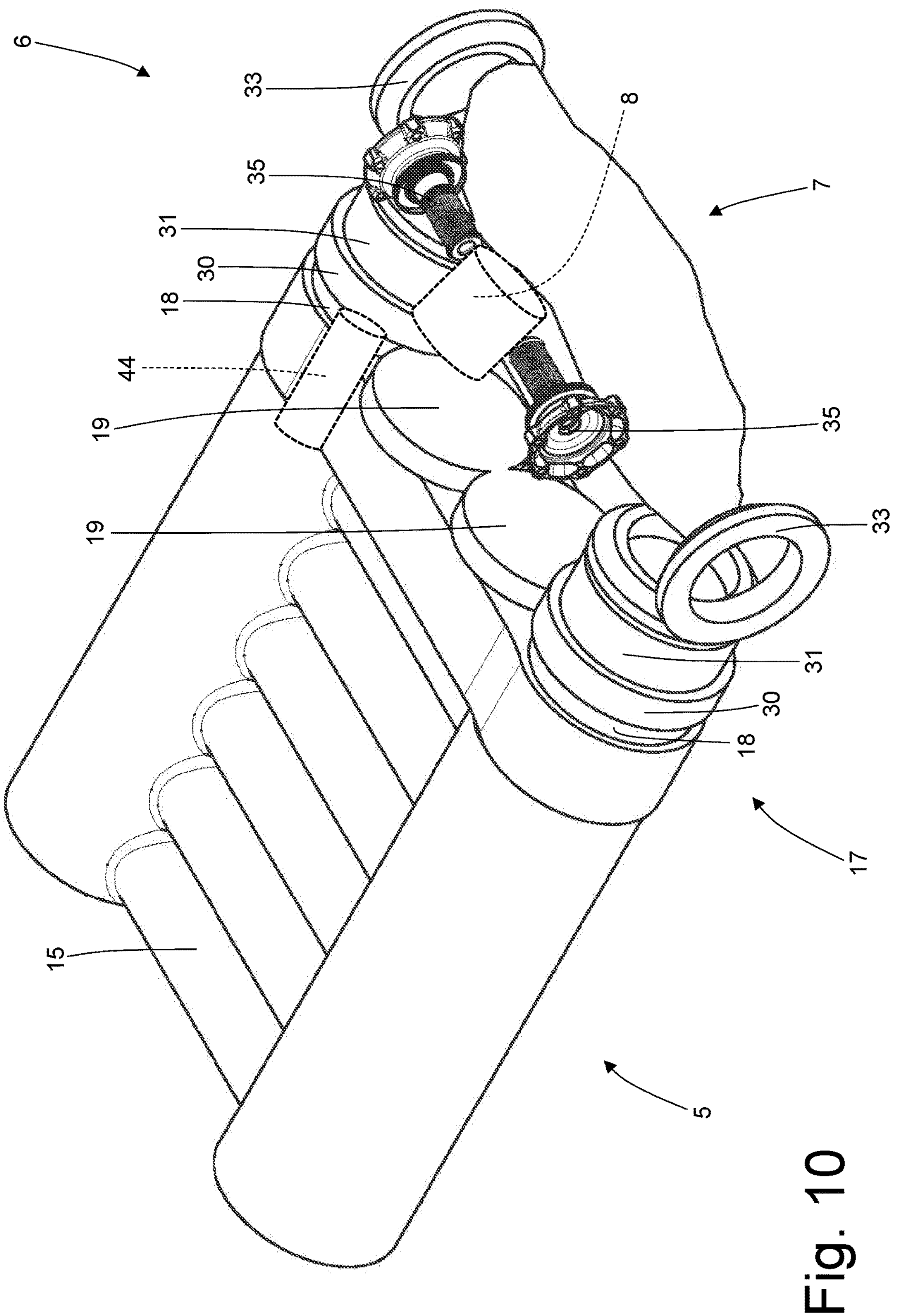
FIG. 10 is a perspective view of a variation of the internal combustion engine of FIG. 1 combined with a drive system.

In the variation illustrated in FIG. 10, the gear transmission 17 comprises two lateral toothed wheels 18, each integral with a corresponding crankshaft 16, and two twin central toothed wheels 19 which are hinged idle to the crankcase 15, each laterally mesh with a respective lateral toothed wheel 18, and centrally mesh with one another.

According to a different embodiment not illustrated, one single reversible electric machine is provided which carries out both the function of alternator (being made to operate as electric generator), and the function of starter motor (being made to operate as electric motor); the single reversible electric machine can be connected to a crankshaft 16 (in place of the alternator 40) or can be connected to the gear transmission 17 (in place of the starter motor 44).

According to what is illustrated in FIGS. 3 and 6, the car 1 comprises a rear aerodynamic diffuser 45 which faces the road surface, starts in the area of a rear wall of the crankcase 15 of the internal combustion engine 5 and is (partially) arranged under the gearbox 7.

According to what is illustrated in FIG. 6, inside a chassis of the car 1 an engine compartment 46 is obtained in which the internal combustion engine 5 is arranged. According to what is illustrated in FIG. 3, the bottom 11 of the car 1 comprises an opening 47 which is arranged in the area of the engine compartment 46 and a removable panel 48 which is fixed in a removable manner and closes the opening 47. The opening 47 has a dimension similar to a dimension of the engine compartment 46; i.e. the dimension of the opening 47 is approximately (as much as possible) identical to the dimension of the engine compartment 46 so that through the opening 47 there can be a complete access to the engine compartment 46.

According to a preferred embodiment, the removable panel 48 is at least partially transparent; in particular, the removable panel 48 centrally has a transparent window 49 (for example made of glass). The function of the transparent window 49 is essentially technical as it allows visibly inspecting the internal combustion engine 5 without having to remove the removable panel 48.

According to a preferred embodiment, the body 10 has no openable hood (arranged above the engine compartment 46) which allows access to the engine compartment 46; i.e. the access to the engine compartment 46 occurs only from below through the opening 47 as the upper part of the engine compartment 46 is permanently closed by fixed non-removable panels of the body 10. To such regard, it is important to observe that a top access to the engine compartment 46 would be anyway very difficult as it would require to remove the tanks 12.

According to a preferred embodiment, the removable panel 48 is directly fixed to the chassis 76 by means of a plurality of screws 50 (preferably quarter-turn screws 50). The rear aerodynamic diffuser 45 faces the road surface, is arranged behind the removable panel 48, and borders with the removable panel 48. Namely, the rear aerodynamic diffuser 45 starts where the removable panel 48 ends. Also the aerodynamic diffuser 45 is removable for allowing a simpler access to the gearbox 7.

The embodiments described herein can be combined with one another without departing from the scope of protection of the present invention.

The above-described car 1 has numerous advantages.

Firstly, the above-described car 1 allows simultaneously combining a large hydrogen storage capacity (being thus able to offer a satisfactory autonomy) with a very high dynamic performance thanks to a wheelbase, an overall weight, and a weight distribution which are optimal. These results are obtained thanks to the particular conformation and arrangement of the internal combustion engine 5 and of the drive system 6 which allow creating a substantial free space for housing the hydrogen tanks 12 without penalizing the dynamic performance of the car 1. In fact, the internal combustion engine 5 and the drive system 6 are completely located in a central position (i.e. between the front wheels 2 and the rear wheels 4) and are arranged very low; consequently, the centre of gravity of the car 1 is perfectly central and is arranged low enabling obtaining an optimal dynamic behaviour of the car 1. To such regard, it is important to note that the tanks 12 are arranged above, but despite being very bulky they have, on the whole, a reduced weight (also when they are full).

The above-described car 1 allows providing a rear aerodynamic extractor (diffuser) having extremely large dimensions thus allowing the generation of a very high aerodynamic load without any penalization of the drag. Namely, in the above-described car 1, the aerodynamic diffuser 45 has a very large dimension (it thus allows generating a high aerodynamic load for a modest increase in the drag) even if the internal combustion engine 5 is placed in a central/rear position (thus having an optimal mass distribution between the front axle and the rear axle) and, simultaneously, the wheelbase is relatively short (i.e. the car 1 has an extremely performing dynamic behaviour).

In the above-described car 1, also thanks to the particular conformation of the dual-clutch gearbox 7 which is transversely arranged immediately behind the internal combustion engine 5, it is possible to obtain a particularly favourable (i.e. compact despite being very functional) location of all the elements of the powertrain system for minimizing the wheelbase length (i.e. the distance between the front axle and the rear axle).

In the above-described car 1, the accessibility to all the zones of the internal combustion engine 5 is optimal and complete; this result is obtained thanks to the accessibility from the bottom which, once lifted the car 1, always allows an operator to arrange himself/herself exactly under the component on which to intervene. Namely, the accessibility from the bottom to the internal combustion engine 5 makes the maintenance easy and simple, as the operators are not limited by the shape of the car 1 but can easily move in all the zones of the internal combustion engine 5 being the car 1 lifted.

In the above-described car 1, the fact that the removable panel is at least partially transparent constitutes, besides an undoubtful technical advantage as explained in the foregoing, an aesthetic innovation and makes the removable panel also an aesthetic element; it is important to note that thanks to the aerodynamic diffuser 45 of great dimensions, it is relatively easy to see through the transparent wall of the removable panel at least part of the internal combustion engine 5 without having to exceedingly bend.

In the above-described car 1, the body 10 results particularly rigid and resistant thanks to the complete absence of an opening for the access to the engine compartment 46 (and normally closed by a hood). In this manner, the rigidity being equal, it is possible to reduce the overall mass of the body 10. Furthermore, the absence of an opening for the access to the engine compartment 46 also makes the body 10 completely continuous (i.e. without interruptions) thus reducing the drag coefficient. The possibility to eliminate through the body 10 an opening for accessing the engine compartment 46 is given by the fact that the internal combustion engine 5 is very thin and is arranged in substantial contact with the bottom 11 of the car. Therefore, all the main components of the internal combustion engine 5 are located in the lower part of the engine compartment 46 and are easily accessible from the bottom 11 through the opening 47 closed by the removable panel 48.

LIST OF THE REFERENCE NUMERALS OF THE FIGURES

1 car
2 front wheels
3 electric machine

4 rear wheels
5 internal combustion engine
6 drive system
7 gearbox
8 rear differential
9 passenger compartment
10 body
11 bottom
12 tank
13 pistons
14 cylinders
15 crankcase
16 crankshaft
17 gear transmission
18 lateral toothed wheel
19 central toothed wheel
20 suction ports
21 exhaust ports
22 fuel injector
23 spark plug
24 suction duct
25 suction manifold
26 exhaust duct
27 treatment device
28 turbocharger
29 intercooler
29 EGR duct
30 flywheel
31 clutches
32 input shafts
33 bevel gear
34 output shaft
35 axle shafts
36 primary toothed wheel
37 secondary toothed wheel
38 synchronizers
39 output toothed wheel
40 alternator
41 drive
42 compressor
43 drive
44 starter motor
45 aerodynamic diffuser
46 engine compartment
47 opening
48 removable panel
49 transparent window
50 screws

The invention claimed is:

1. A car (1) comprising:
two front wheels (2);
two rear wheels (4);
an opposed-piston internal combustion engine (5) comprising: a crankcase (15), a number of cylinders (14) obtained in the crankcase (15), a number of pistons (13) twice the number of the cylinders (14) as two opposed pistons (13) slide in each cylinder (14), and two crankshafts (16), which are longitudinally oriented and are each connected to a respective half of the pistons (13) arranged on a same side of the crankcase (15); and
a gearbox (7), which is connected to the crankshafts (16) of the internal combustion engine (5), is arranged behind the internal combustion engine (5) and comprises two clutches (31), each separate and far from the other clutch (31) and connected to a corresponding crankshaft (16), and two input shafts (32), each connected to a respective clutch (31).

2. The car (1) according to claim 1, wherein the two input shafts (32) are coaxial to one another, are transversely oriented and face one another head-to-head.

3. The car (1) according to claim 1, wherein each clutch (31) is coaxial to the corresponding crankshaft (16) and is directly connected to an end of the corresponding crankshaft (16).

4. The car (1) according to claim 3, wherein the two input shafts (32) are transversely oriented and between each clutch (31) and the corresponding input shaft (32) there is interposed a bevel gear (33).

5. The car (1) according to claim 1, wherein:
the two input shafts (32) are transversely oriented;
each clutch (31) is coaxial to the corresponding input shaft (32) and is directly connected to the respective input shaft (32); and
between each clutch (31) and the corresponding crankshaft (16) there is interposed a bevel gear (33).

6. The car (1) according to claim 1, wherein the gearbox comprises:
an output shaft (34);
a plurality of gears, each defining a respective gear ratio and configured to transmit the motion from a respective input shaft (32) to the output shaft (34); and
an output toothed wheel (39), which is integral with the output shaft (34) and is connected to a differential (8) without the interposition of a bevel gear.

7. The car (1) according to claim 1 and comprising a differential (8), which is arranged above the gearbox (7).

8. The car (1) according to claim 1, wherein the internal combustion engine (5) comprises a gear transmission (17), which connects the two crankshafts (16) to one another and comprises two lateral toothed wheels (18), each integral with a corresponding crankshaft (16), and at least one central toothed wheel (19).

9. The car (1) according to claim 8, wherein each lateral toothed wheel (18) is arranged between the crankcase (15) and the corresponding clutch (31).

10. The car (1) according to claim 8, wherein the internal combustion engine (5) comprises two flywheels (30), each connected to a corresponding crankshaft (16) and arranged between the respective lateral toothed wheel (18) and the respective clutch (31).

11. The car (1) according to claim 8 and comprising an electric machine, which is configured to operate as a starter motor (44) of the internal combustion engine (5) and is connected to the gear transmission (17).

12. The car (1) according to claim 1, wherein the internal combustion engine (5) is powered with hydrogen; and
at least one tank (12) is provided, which is configured to contain hydrogen and is arranged above the internal combustion engine (5) and above the gearbox (7).

13. The car (1) according to claim 1 and comprising an electric machine, which is configured to operate as an alternator (40) and is connected to an end of a crankshaft (16) projecting out of the crankcase (15) on the opposite side relative to the gearbox (7).

14. The car (1) according to claim 1 and comprising a compressor (42) of an air conditioning system, which is connected to an end of a crankshaft (16) projecting out of the crankcase (15) on the opposite side relative to the gearbox (7).

15. The car (1) according to claim 1 and comprising a rear aerodynamic diffuser (45), which faces a road surface, starts in the area of a rear wall of the crankcase (15) of the internal combustion engine (5) and is partially arranged under the gearbox (7).

16. The car (1) according to claim 1 and comprising:

an engine compartment (46), where the internal combustion engine (5) is arranged; and a bottom (11), which is the lowest part of the car (1), in use faces a road surface on which the car (1) is moving and comprises an opening (47), which is arranged in the area of the engine compartment (46), and a removable panel (48), which is fixed in a removable manner and closes the opening (47) and is preferably at least partially transparent.

17. The car (1) according to claim 1, wherein the body (10) has no openable hood arranged above the engine compartment (46) and allowing access to the engine compartment (46).

* * * * *